June 7, 1955
R. M. DILWORTH
2,709,967
COOLING AND VENTILATING SYSTEM FOR
GENERATING ELECTRIC LOCOMOTIVES
Filed Aug. 13, 1949
3 Sheets-Sheet 1
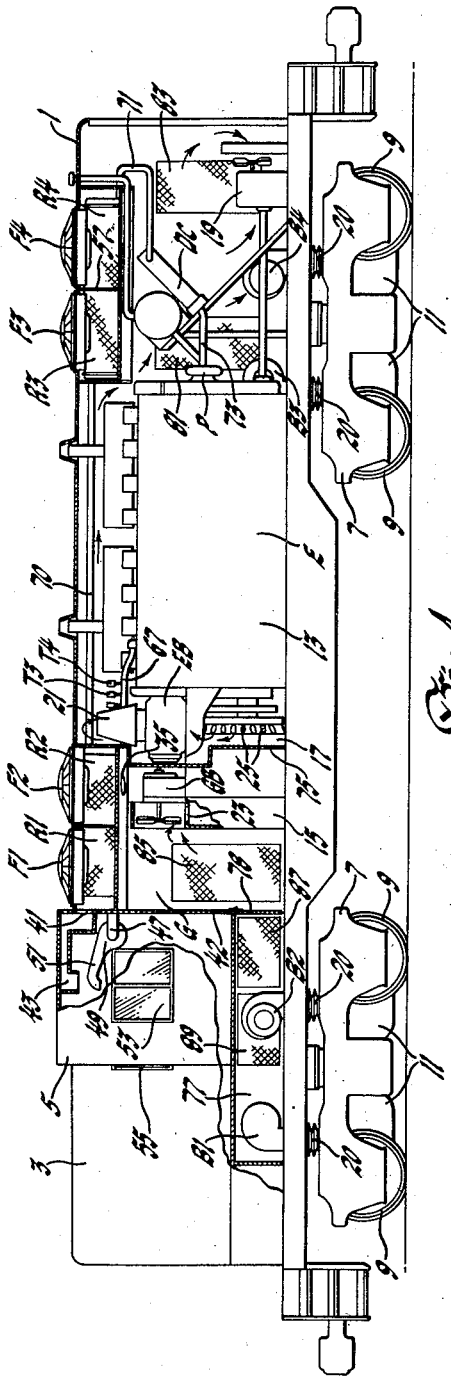
Inventor
Richard M. Dilworth
By
Spencer, Willits, Helwig & Baillo
Attorneys June 7, 1955

R. M. DILWORTH 2,709,967

COOLING AND VENTILATING SYSTEM FOR
GENERATING ELECTRIC LOCOMOTIVES

Filed Aug. 13, 1949

Inventor
Richard M. Dilworth
By
Spencer Willet, Helwig & Baillio
Attorneys

June 7, 1955
R. M. DILWORTH
2,709,967
COOLING AND VENTILATING SYSTEM FOR
GENERATING ELECTRIC LOCOMOTIVES
Filed Aug. 13, 1949
3 Sheets-Sheet 3
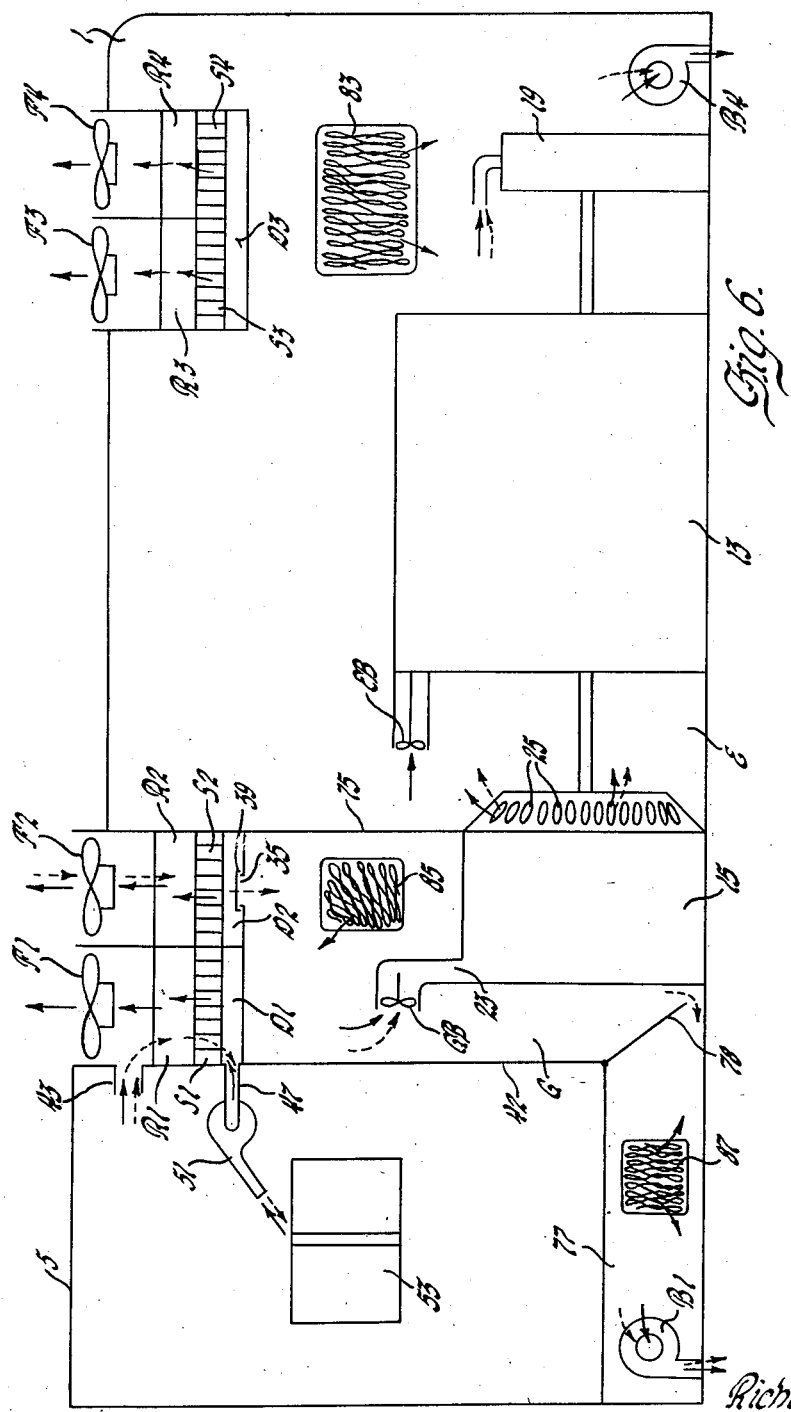
INVENTOR
Richard M. Dilworth
BY
ATTORNEYS

United States Patent Office 2,709,967
Patented June 7, 1955

2,709,967

COOLING AND VENTILATING SYSTEM FOR GENERATING ELECTRIC LOCOMOTIVES

Richard M. Dilworth, Hinsdale, Ill., assignor to General Motors Corporation, Detroit, Mich., a corporation of Delaware Application August 13, 1949, Serial No. 110,057

8 Claims. (Cl. 105—35)

This invention generally relates to generating electric traction locomotives and more particularly to combined cooling, ventilating and heating systems therefor.

The principal object of the present invention is to provide adequate quantities of clean dry air to the interior of one portion of the locomotive including generating electric traction and auxiliary apparatus and for maintaining comfortable conditions in another body cab portion under widely different ambient temperature operating conditions by the provision of filters in the apparatus portion of the body and outside air ducts including, air entrance shutters, air circulating means and cooling means for certain of the traction apparatus from which warm air from the cooling means is conducted to either the apparatus or cab portions of the body through passages extending from the duct under low ambient temperature operating conditions to melt snow from the outside air and from the air filters and to maintain comfortable temperatures in the cab portion and defrost the windows therein and to supply outside air to the cab portion under higher ambient temperature conditions to provide adequate cab ventilation.

The combined means by which this object is accomplished will become apparent by reference to the following detailed description and drawings illustrating one form of the invention which is particularly adapted for a general purpose diesel electric locomotive.

Figure 1 of the drawings is a vertical elevation view of the locomotive with parts shown broken away and in section to show details of the invention.

Figure 2 is an enlarged view of some of the parts shown in Figure 1 broken away and in section.

Figure 6 is a diagrammatic view of the ventilating system showing the principal elements thereof in the operator's cab and power generating section and the direction of air flow between them.

Figure 3:
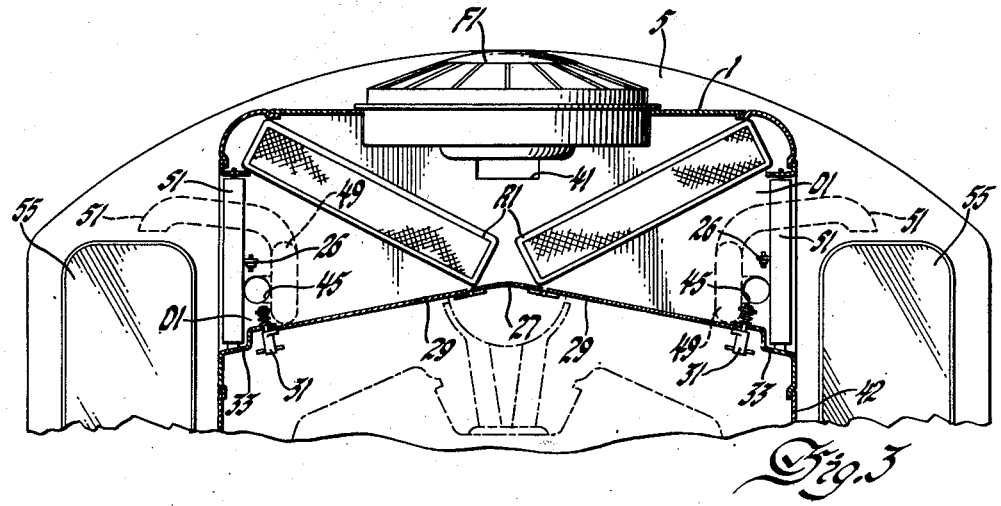
Figure 3 is a vertical cross sectional elevation view taken on line 3—3 of Figure 2.

As best seen in Figure 1, the locomotive body comprises a long narrow hood portion 1 at one end, a shorter narrow hood portion 3 at the other end and a wide cab portion 5 intermediate these hood portions. The locomotive body is supported adjacent the ends on two articulated traction trucks 7 each having a pair of axles with attached traction wheels 9 and nose suspended electric traction motors 11 each operatively connected to a separate axle in conventional manner.

The longer body hood portion 1 encloses a diesel engine 13 shown directly connected at one end to a combined electric traction generator 15 and an alternator 17 having a unitary stator. An air brake compressor 19 is shown directly driven from the other end of the engine. The generator 15 supplies power to the traction motors 11 and the alternator 17 supplies power to four induction motor driven engine radiator cooling fans F1—F2—F3—F4 and four traction motor cooling blowers B1—B2—B3—B4 so that these fans and blowers operate at a speed proportional to that of the engine. Each of the traction motor blowers supplies cooling air to a respective traction motor 11 through a flexible conduit 20. The engine 13 is provided with a blower EB shown directly driven thereby and provided with an air intake silencer 21. A generator blower GB is mounted on the stator of the generator and alternator 15—17 and is shown directly connected to the engine blower EB. The generator blower GB supplies cooling air through an air inlet opening 23 in the upper portion of the generator and alternator stator which is shown provided with air exhaust openings 25 at the other end adjacent the engine 13.

Radiator cooling air inlet openings each including radiator shutter mechanisms S1—S2—S3 are provided in the sides of the hood 1 adjacent the upper ends thereof and radiator exhaust air openings each including one of the radiator exhaust fans F1—F2—F3—F4 are located in the top of the hood portion 1 in transverse alignment with the shutters S1—S2 and S3 as best illustrated in Figure 2. Radiator air cooling ducts D1—D2—D3 of similar form extend between the shutters S1—S2—S3 in the sides and the exhaust fans F1—F2—F3—F4. As best illustrated in Figure 3, a pair of engine water cooling radiator sections R1 are included in the duct D1, each radiator section being located in the duct D1 between a shutter mechanism S1 and the exhaust cooling fan F1. The shutter mechanisms S1 are operated manually by reach rods 26 extending therefrom into the cab 5 and are shown provided with a suitable operating handle. It will be noted in Figure 3 that each of the radiator sections R1 slopes downwardly and inwardly from each of the upper corners of the hood portion 1 to the central bottom portion 27 of the duct D1 having separate bottom side portions 29 shown hinged to the central bottom portion 27 and sloping downwardly and outwardly therefrom and held with latches 31 in overlapping contact with the lower lip 33 of the openings in the hood sides in which the shutter mechanisms S1 are positioned to permit drainage of moisture outwardly of these shutter mechanisms. Registering rectangular openings 41 are shown provided in the duct D1 and adjacent end wall 42 of the cab 5 on the vertical center line thereof between the radiator sections R1 and suction side of the exhaust fan F1. A cab ventilating exhaust duct 43 shown in Figures 1 and 2 leads from the opening 41 into the cab 5 and opens downwardly from a point adjacent the center of the cab headlining. Smaller circular openings 45 are also provided in the duct D1 and adjacent end wall 42 of the cab 5 between the shutters S1 and radiator sections R1, as shown in Figure 3, and separate ventilating ducts 47 are shown in Figures 1 and 2 leading therefrom, each duct 47 including a motor driven centrifugal blower 49 having an exhaust pipe 51 extending upwardly and transversely outward to a point above and directed downwardly along the inside of each of the side cab windows 53 for the locomotive engineer and fireman. The cab 5 is also provided with end windows 55 facing along the sides of the hood portions 1 and 3. A cap 56 shown in dotted lines in Figure 2 above the exhaust fan F1 provides the means for closing the exhaust side of this fan.

Figure 4:
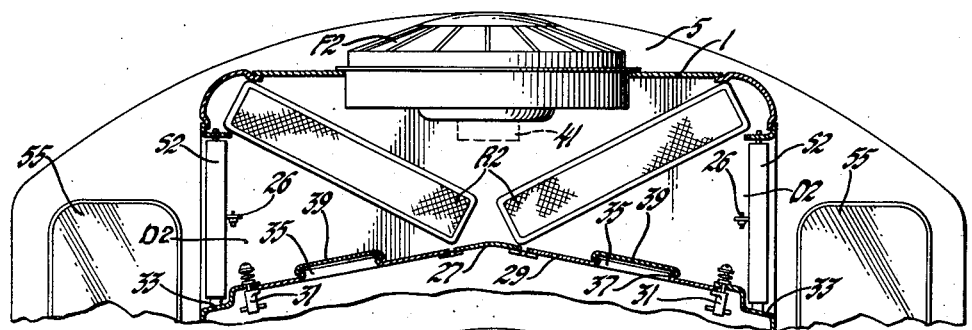
Figure 4 is a vertical cross sectional elevation view taken on line 4—4 of Figure 2.

The duct D2, as shown in Figure 4, located adjacent the duct D1 is of similar form and is also provided with a pair of radiator sections R2 positioned therein in similar manner adjacent the radiator sections R1 in the duct D1. Each of the sloping hinged bottom side portions 29 of the duct D2 is provided with an opening 35 having an upturned lip 37 over which a cover 39 is placed to normally prevent passage of air and water through these openings 35.

Figure 5:
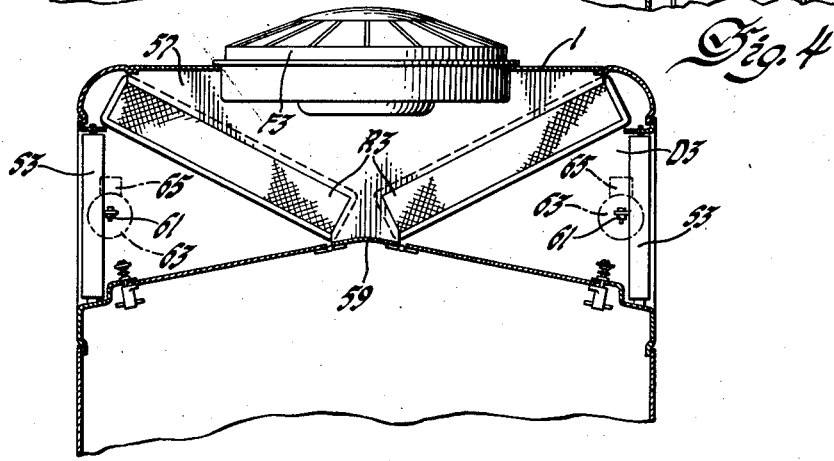
Figure 5 is a vertical cross sectional elevation view taken on line 5—5 of Figure 2.

The duct D2 is of similar form to the ducts D1—D3 but is longer, as shown in Figures 1 and 2, to include two pairs of adjacent radiator sections R3—R4, the forward pair R3 being positioned therein as shown in Figure 5 and the pair R4 being rearwardly thereof, in like manner to those in the ducts D1—D2. The hinged bottom side portions of the ducts D1 and D3 are not provided with openings 35 and covers 39 as provided in the duct D2 but a V shaped transverse air baffle 57 is shown in Figures 1, 2 and 5 extending downwardly from the upper portion of the hood 1 to the upper adjacent edges of the radiator sections R3—R4 and to the lower central portion 59 of the duct D3 to permit reverse air flow through the exhaust fan F4 and radiator sections R4 and in the normal direction of flow through the radiator sections R3 and exhaust fan F3 when this fan is operating and the shutters S3 in the duct D3 are closed.

As best shown in Figure 2, each of the shutter mechanisms S2 and S3 in the ducts D2—D3 is provided with operating rods 61 shown operable by conventional electropneumatic operating means comprising a pneumatic cylinders 63 for the shutters S2—S3. Each of these connected to a shutter operating rod 61 and normally tending to retain the shutters S2—S3 closed. The piston is movable in the cylinder 63 upon energization of an electropneumatic valve 65 connected between a source of air pressure on the locomotive and a cylinder 63 to cause application of air pressure to the cylinder and piston in order to cause movement of the piston and operating rod 61 against the piston biasing spring to cause opening of the shutters. Deenergization of the electropneumatic valve causes relief of pressure in the cylinder 63 and movement of the piston and operating rod 61 by the piston biasing spring to return the shutters to the normal closed position in a well known manner.

As best seen in Figures 1 and 2, the radiator sections R1—R2—R3—R4 in each side of the hood 3 are connected in series between an engine outlet cooling water manifold 67, an engine oil cooler DC and the inlet of an engine driven cooling water pump P by separate pipe connections each including pipes 69—70—71—73 so that water is circulated through these radiator sections in the order stated above. Temperature responsive switches T1—T2—T3—T4 are shown located in the engine outlet water manifold 67 for controlling energization and deenergization of the exhaust fans F1—F2—F3—F4 and the electropneumatic valves 65 of the shutter operating cylinder 63 including a spring biased piston, not shown, temperature responsive switches being normally open and each closes upon different preselected values of temperature of the water in manifold 67 to be given subsequently in explaining the operation of these shutters and exhaust fans.

As best seen in Figure 1, the hood section is provided with a partition 75 extending transversely across this hood section and having an opening therein fitting the periphery of the generator and alternator stator to divide this hood section into an engine compartment E and a generator compartment G. It will be noted that the air inlet of the generator blower GB opens into the generator compartment and the air outlet openings 17 in the stator opens into the engine compartment E. A duct 77 extends below the floor of the cab 5 from the generator compartment G to the traction motor blowers B1 and B2 and a door 78 is hinged to the lower portion of the end wall 42 of the cab to connect or disconnect the duct 77 with the generator compartment G. The engine compartment is provided with openings in the sides of the hood 1 in which air inlet filters 81—83 are placed. The generator compartment G is also provided with openings in the sides of the hood 1 in which inlet air filters 85 are placed and the duct 77 has openings in the lower sides of the cab 5 in which inlet air filters 87—89 are placed.

With the various outside air inlet openings including the filters 81—83—85—87—89 located in the opposite sides of the hood portion 1 and cab 5 of the locomotive, clean air is provided for the inlet air silencer 21 for the engine blower EB, the air brake compressor 19, the generator blower GB and traction motor blowers B1—B2—B3—B4 housed therein. It will be noted that the generator blower GB draws cooling air from the generator compartment G and forces it through the inlet opening 23 of the generator-alternator stator from which it is exhausted at higher temperature through the exhaust openings 25 into the engine compartment G for use by the engine 13 and air brake compressor 19.

Upon starting of the engine under normally ambient temperature conditions the manually operable radiator shutters S1 are closed and all of the other electropneumatically operated shutters S2—S3—S4 are normally closed and all of the radiator exhaust fans F1—F2—F3—F4 are shut down as the temperature responsive switches T1—T2—T3—T4 in the engine water outlet manifold 67 controlling these fans and the shutters S2—S3—S4 are normally open. When the temperature of the water in the engine outlet manifold rises to 165° F. the temperature responsive switch T1 closes to energize the induction motor radiator fan F1 from the engine driven alternator 17, suitable electrical connections being provided therebetween to cause operation of the fan F1 at a speed proportional to that of the alternator 17. If the manually operable shutters S1 in the inlet openings of the duct D1 are closed, the fan F1 draws air from the cab 5 through the upper ventilating duct 43 and through the two side ventilating ducts 47 as the upper duct is connected to the radiator duct D1 above the radiator sections R1 and the side ducts are connected thereto below the radiator sections. This gives maximum ventilation of the cab. The shutters S1 may then be opened by means of the handle in the cab on the operating rod 26 extending to the shutters S1 so that outside air will then be drawn through these shutters and radiator sections and exhausted by the fan F1. There will still be suction applied however by the fan F1 in the upper cab ventilating duct 43 and also in the lower ventilating ducts 47 due to the pressure drop across the radiator sections R1 with the shutters S1 fully open to provide adequate ventilation of the cab. Upon operation of the locomotive when the temperature of the water in the engine water outlet manifold increases to 168° F. the temperature responsive switch T3 closes to energize the radiator exhaust fan F3 from the alternator 17, other suitable electrical connections being provided therebetween to cause operation of the fan F3 at a speed proportional to the alternator. This causes reverse flow of air downwardly through the radiator exhaust fan F4 along one side of the baffle 57 in the duct D3 and through the radiator sections R4 and flow along the interior of the closed shutters S3 and air flow in the normal direction through the radiator sections R3 and upwardly past the other side of the baffle 57 in the duct D3 and exhaust of the air by operation of the exhaust fan F3.

Should the water in the engine outlet manifold increase to 171° F. the temperature responsive switch T4 closes to energize the radiator exhaust fan F4 from the alternator 17 to cause operation of the fan F4 at a speed proportional thereto and to also energize the electromagnetic valves 65 from the locomotive battery and cause application of air pressure to the pneumatic cylinders 63 and pistons therein connected by the operating rods 61 to open the shutters S3 in the duct D3, suitable electrical and pneumatic connections being provided for this purpose from the alternator and air pressure source on the locomotive. This causes air to be drawn through these shutters and the radiator sections R3—R4 and be exhausted by the operation of the fans F3—F4.

Should the water temperature in the engine water outlet manifold 67 rise to an excessive value of 180° F. due to some unusual condition, such as encountered in a tunnel in which the air therein is forced out ahead of the locomotive, the temperature responsive switch T2 closes to cause energization of the radiator exhaust fan F2 from the alternator 17 and simultaneously energization from the locomotive battery of electromagnetic valves 65 in the pneumatic cylinders 63 for the shutters S2 and application of a pressure thereto from the air pressure source to cause opening of the shutters S2, other electrical and pneumatic connections being provided for this purpose. This causes outside air to then also be drawn through the shutters S2 and radiator sections R2 in the duct D2 and to be exhausted by the operation of the fan F2 at a speed proportional to the alternator. The direction of ventilating and cooling air flow under this latter condition (with all four exhaust fans F1–F4 operating and all four shutters S1–S4 open) is shown by the solid line arrows in the diagrammatic sketch, Figure 6. Under normal full load operation of the locomotive, the fan F2 will not start and shutters S2 will remain closed as the temperature of the water in the engine outlet water manifold will not reach a temperature of 180° F. and the temperature responsive switch T2 will remain open.

For winter operation the induction motor driven fan F1, in the duct D1, is electrically disconnected from the alternator 17 and temperature responsive switch T1 therefor and the manual shutters S1 in this duct are left closed. The engineer and fireman may then operate suitable electrical control switches, not shown, on the motor driven centrifugal blowers 49 in the side cab ventilating ducts 47. This causes air to be drawn outwardly from the upper central portion of the cab 5 to the radiator duct D1 and through the warm radiator sections R1 and discharged through the ducts 47 and exhaust pipes 51 leading from the blowers 49 to direct this heated air downwardly above the heads of the engineer and fireman from the exhaust pipes 51 of these blowers and downwardly along the inside of the side and end cab windows 53—55 for defrosting these windows and for maintaining a comfortable temperature in the cab. If the cab becomes too warm the cab temperature may be reduced by manually opening the shutters S1 for admitting some outside air to the motor driven blowers 49.

Under blizzard conditions, with the fan F1 disconnected and the manual shutters S1 closed in the duct D1, the covers 39 are removed from the openings 35 in the lower hinged portions 29 of the duct D2 so that additional warm air may also be drawn into the generator compartment G of the hood 1 by the suction of the generator blower GB and traction motor blowers B1—B2 in the duct 77 leading from this compartment through the fan F2, warm radiators R2 and through the uncovered openings 35 in the duct D2. Any snow in the outside air is melted by the warm radiators R1. This melted snow water flows down the sloping bottom portions 29 of the duct around the raised lip portion 37 of the openings 35 therein and flows out through the closed shutters S2, slight clearance is provided below these shutters for this purpose. This additional warm dry air entering the generator compartment G melts snow and ice collected in the filters 85—87—89 in the generator compartment G and duct 77 placed in communication therewith through the open door 78 therebetween.

The warm dry air forced through the inlet and exhaust openings 23—25 in the generator and alternator by the generator blower GB cools the generator and alternator and enters the engine compartment E to warm it and melt ice and snow collected on the air filters 81—83 for this compartment and enters the engine 13 and air compressor 19.

It will be evident that any snow entering any of the other radiator ducts D2—D3—D4 is melted by passage through the radiator sections R2—R3—R4 therein and the water drains outwardly along the sloping bottom portions of these ducts and a clearance opening at the bottom of these shutters.

To protect against overcooling of the engine when idling for long periods of time when all the shutters are closed in extremely cold weather the cap 56, shown in dotted lines in Figure 2, is placed over the upper end of the exhaust fan F1.

The temperature responsive switches T1—T2—T3—T4 in the engine water outlet manifold 67 open at slightly lower temperature than the above mentioned closing temperature. When the water temperature falls to 170° F. the switch T2 opens to cause shut down of the fan F2 and closure of the shutters in duct 2. When the water temperature falls to 161° F. the temperature switch T4 opens to shut down fan F4 and cause closure of the shutters of the duct D3. When the water temperature falls to 158° F. the switch T3 opens to shut down fan F3 and when the water temperature falls to 155° F. the switch T1 opens to shut down fan F1. The direction of the ventilating and cooling air flow under such blizzard conditions (with all four exhaust fans F1—F4 shut down and all four shutters S1—S4 closed) is in the direction of the broken line arrows in the diagrammatic sketch, Figure 6.

The above described locomotive ventilating, cooling and heating system provides clean dry air for the power generating and traction apparatus and auxiliaries of the locomotive, keeps the cab comfortable and the apparatus compartments at the proper temperature under wide and sudden changes in ambient temperature and prevents overheating and overcooling of the power generating and traction apparatus under all operating conditions.

I claim:

1. In a locomotive, a body including an operator's enclosure having windows and an apparatus enclosure having outside air inlet openings including air filters and enclosing an internal combustion engine having a blower driven thereby and a traction generator and generator cooling blower driven by the engine, and an air duct having outside air inlet and outlet openings, shutters in the duct inlet opening operable from the operator's enclosure, said duct enclosing an exhaust fan and an engine cooling radiator positioned between the shutters and fan, said operator's enclosure having two separate ventilating ducts connected to the air duct on opposite sides of the radiator for exhaust of air from the operator's enclosure when the exhaust fan is operating and the windows are open, the one of said ventilating ducts connected to the shutter side of the cooling radiator having a blower in series therewith for inducing a reverse flow of air through said exhaust fan, radiator and said one ventilating duct to the cab enclosure when the shutters are closed and the exhaust fan is shut down.

2. In a locomotive, a body including an operator's cab having windows and a duct therein having outside air inlet openings including filters and air outlet openings, a power generating section including an engine compartment and a generator compartment, said engine compartment having outside air inlet openings including filters and outlet openings and enclosing an internal combustion engine having a blower furnishing air thereto, said generator compartment also having outside air inlet openings including filters and enclosing a traction generator and a generator blower driven by the engine and furnishing air to the generator, said generator having air outlet openings communicating with the engine compartment, said generator compartment also having an opening communicating with the air duct in the operator's cab, and a door operable to shut off the generator compartment opening from the operator's cab, said engine and generator compartments having overhead cooling air ducts, each having an outside air inlet opening including shutters, an exhaust fan and an engine cooling radiator adjacent the shutters, said generator compartment cooling duct having an upwardly flanged opening in the bottom communicating with the generator compartment and a cover removable from the flanged opening for directing additional warm air from the radiator, when the shutters are closed and the exhaust fan is shut down to the generator compartment and for directing drain water around the flanged opening.

3. In a locomotive, a body including an operator's cab having windows and a power generating section comprising an engine compartment having outside air inlet openings including filters and outlet air openings and enclosing an internal combustion engine, and a generator compartment having outside air inlet openings including filters and enclosing a generator and a generator blower driven by the engine, said generator blower supplying cooling air to said generator from the generator compartment filters, said generator having cooling air outlet openings communicating with the engine compartment, separate outside air cooling ducts in the upper portion of the engine and generator compartments each including an inlet opening having shutters, an exhaust fan and an engine cooling radiator intermediate the shutters and fan, one of the generator compartment cooling air ducts having an upwardly flanged opening in the bottom adjacent the shutters and communicating with the inlet to said generator blower, a cover for said flanged opening removable therefrom to enable said generator blower to induce a reverse flow of air through said fan, radiator and flanged opening of this duct during cold weather engine operation when the shutters are closed and the exhaust fan is shut down in this duct to melt snow from the filters in the generator and engine compartments, another of said cooling ducts having a cab ventilating duct leading from the exhaust fan side of its radiator to the upper portion of said cab and other cab ventilating ducts including blowers, leading from points adjacent the shutters to points in the cab adjacent the cab windows, all of said cab ventilating ducts serving to conduct air from the cab to said last named cooling duct when the exhaust fan is operating and the ventilating duct blowers are shut down, said other ventilating ducts being effective to conduct a reverse flow of air induced by the blowers therein through the fan and radiator in said last named cooling duct and into the cab when said ventilating duct blowers are operating and said fan in said last named cooling duct is shut down.

4. In a locomotive, a body including an apparatus enclosure and a cooling air duct in the apparatus enclosure having cooling air inlet and exhaust openings, apparatus cooling means located intermediate the inlet and exhaust openings, closable shutters in the inlet opening and an air opening in said duct connecting the air inlet opening side of said cooling means to the apparatus enclosure exteriorly of said duct for entry of air through said cooling means from the exhaust opening when said shutters are closed.

5. In a locomotive, a body including a power apparatus compartment and an operator's compartment, an apparatus cooling air duct in the body having a closeable air inlet opening in the side of the body and an exhaust opening in the top of the body, apparatus cooling means intermediate the inlet and exhaust openings, an exhaust fan in said exhaust opening, and ventilating openings in said duct connecting the air inlet side of said cooling means with the interior of the operator's compartment for entry of air through said cooling means from the exhaust opening when said shutters are closed.

6. In a locomotive, a body including a power apparatus compartment and an operator's compartment, an apparatus cooling air duct in the body having an air inlet opening in the side of the body, an exhaust opening in the top of the body, apparatus cooling means located intermediate the inlet and exhaust openings and ventilating openings located adjacent the inlet and exhaust openings and communicating with the interior of the operator's compartment, air circulating means connected with at least one of the ventilating openings in the air duct adjacent the inlet opening therein, a closeable shutter controlling the inlet opening, said air circulating means being operable to draw air inwardly through the exhaust opening and apparatus cooling means into the interior of the operator's compartment to warm this compartment when the inlet opening is closed by said shutter.

7. In a locomotive, a body including an apparatus enclosure having outside air inlet openings including filters and enclosing an internal combustion engine, a traction generator driven thereby and a blower operable by the engine for supplying air to the engine and generator from the filters, and an air duct within the apparatus enclosure having outside air inlet and exhaust openings, shutters in said duct inlet opening, an engine cooling radiator intermediate said shutters and exhaust opening, an exhaust fan in the exhaust opening, said duct having an air supply opening located between the radiator and shutters and communicating with the entrance to said blower and a removable cover for the air supply opening, said cover being removable to cause said blower to induce a reverse flow of air through said fan and radiator into the interior of the apparatus enclosure via said opening during cold weather engine operation when said fan is shut down and said shutters are closed.

8. In a locomotive, a body including a hood having outside air inlet openings including air filters and outlet openings and enclosing an internal combustion engine, a traction generator and blowers driven thereby for supplying air from the filters to the engine and generator and to the outlet openings in the hood, and separate cooling ducts for the engine and generator transversely disposed in the upper portion of the hood, each of said ducts including an outside air inlet opening including shutters, an air exhaust opening including an exhaust fan and an engine cooling radiator between said shutters and fan, said generator duct having an opening in the bottom thereof provided with an upturned lip, said opening being in communication with the inlets of said blowers, whereby during cold weather engine operating conditions with said fan shut down and said shutters closed a reverse flow of air is induced by the blowers through the fan, radiator and said last mentioned opening, said lip serving for conducting melted snow water around the lip of the opening and outwardly through the shutters, and a cover normally covering the duct opening to prevent air from the filters being exhausted from the hood when the shutters are open and the fan is operating to provide maximum cooling air for the radiator in said duct under normal temperature conditions.

References Cited in the file of this patent

UNITED STATES PATENTS

| Number | Name | Date |
|---|---|---|
| 1,708,558 | Wilhelm | Apr. 9, 1929 |
| 1,804,334 | Guernsey | May 5, 1931 |
| 1,987,456 | Woodward | Jan. 8, 1935 |
| 2,009,823 | Van Vulpen et al. | July 30, 1935 |
| 2,170,791 | Blomberg | Aug. 29, 1939 |
| 2,205,266 | Larrecq | June 18, 1940 |
| 2,205,280 | Cain | June 18, 1940 |
| 2,230,580 | Adams et al. | Feb. 4, 1941 |
| 2,423,929 | Dilworth et al. | July 15, 1947 |